(12) United States Patent
Griffin et al.

(10) Patent No.: US 11,868,219 B2
(45) Date of Patent: Jan. 9, 2024

(54) DATA PRESERVATION FOR NODE EVACUATION IN UNSTABLE NODES WITHIN A MESH

(71) Applicant: Red Hat, Inc., Raleigh, NC (US)

(72) Inventors: Leigh Griffin, Waterford (IE); Pierre-Yves Chibon, Saint-Pol-de-Léon (FR)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/736,892

(22) Filed: May 4, 2022

(65) Prior Publication Data

US 2023/0359534 A1 Nov. 9, 2023

(51) Int. Cl.
*G06F 11/18* (2006.01)
*H04L 45/28* (2022.01)

(52) U.S. Cl.
CPC ............ *G06F 11/181* (2013.01); *H04L 45/28* (2013.01); *G06F 2201/805* (2013.01)

(58) Field of Classification Search
CPC .......................... G06F 11/181; G06F 11/2094
USPC .......................................... 714/4.2, 4.21, 6.3
See application file for complete search history.

(56) References Cited

U.S. PATENT DOCUMENTS

| 7,505,450 | B2 | 3/2009 | Castagnoli |
| 8,467,297 | B2 | 6/2013 | Liu et al. |
| 8,510,592 | B1 | 8/2013 | Chan |
| 9,634,928 | B2 | 4/2017 | Choudhury et al. |
| 10,986,387 | B1 | 4/2021 | Parulkar et al. |
| 11,190,391 | B1 | 11/2021 | Joshi et al. |
| 2016/0094398 | A1* | 3/2016 | Choudhury ............. H04L 45/42 370/254 |
| 2018/0139679 | A1* | 5/2018 | Åström ................. H04W 48/16 |
| 2019/0174207 | A1* | 6/2019 | Cella ........................ H04Q 9/00 |
| 2019/0235979 | A1 | 8/2019 | Li et al. |
| 2019/0296993 | A1 | 9/2019 | Subramoni et al. |
| 2019/0349426 | A1* | 11/2019 | Smith .................. H04L 61/4505 |
| 2019/0377399 | A1* | 12/2019 | Cannell ............. H04W 52/0261 |
| 2021/0200446 | A1* | 7/2021 | Sivasubramanian ....................... G06F 3/0683 |
| 2021/0392082 | A1 | 12/2021 | Perocchio |

FOREIGN PATENT DOCUMENTS

| CN | 112395047 A | 2/2021 |
| WO | 2017175216 | 10/2017 |

OTHER PUBLICATIONS

EP Extended Search Report dated May 15, 2023 from related EP Patent Application No. 22197582.4; 9 pages.

* cited by examiner

*Primary Examiner* — Chae M Ko
(74) *Attorney, Agent, or Firm* — Womble Bond Dickinson (US) LLP

(57) ABSTRACT

Described is a system and method that includes executing, by a processing device, a data risk mitigation service (DRMS), to monitor, for each node of a plurality of nodes in a mesh network, at least one of metadata indicating a health state of a node or a call for help from the node. The method includes determining, by the DRMS, whether the node is in an unstable state in view of the metadata or the call for help from the node. The method includes in response to determining that the node is in the unstable state, rerouting incoming data of the node and evacuating data stored in the node.

19 Claims, 7 Drawing Sheets

500a

DATA PRESERVATION FOR NODE EVACUATION IN UNSTABLE NODES WITHIN A MESH

TECHNICAL FIELD

Aspect of the present disclosure relate to mesh networks, and more particularly, to data preservation in mesh networks.

BACKGROUND

A mesh network may include multiple individual nodes/devices, which connect directly, dynamically and non-hierarchically to as many other nodes/devices as possible and cooperate with one another to efficiently route data from/to clients. Each node/device of the mesh network may have its own firmware versions and service versions. In the mesh network, there are a plurality of nodes or mesh devices which generate data and store data. The nodes may suffer from environmental challenges such as light, heat etc. The lifespan of a typical node may be shortened by the environmental challenges. While cloud resources may be used to mitigate the lost data, the cloud resources may not be available at all times. It is difficult to prevent data loss.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
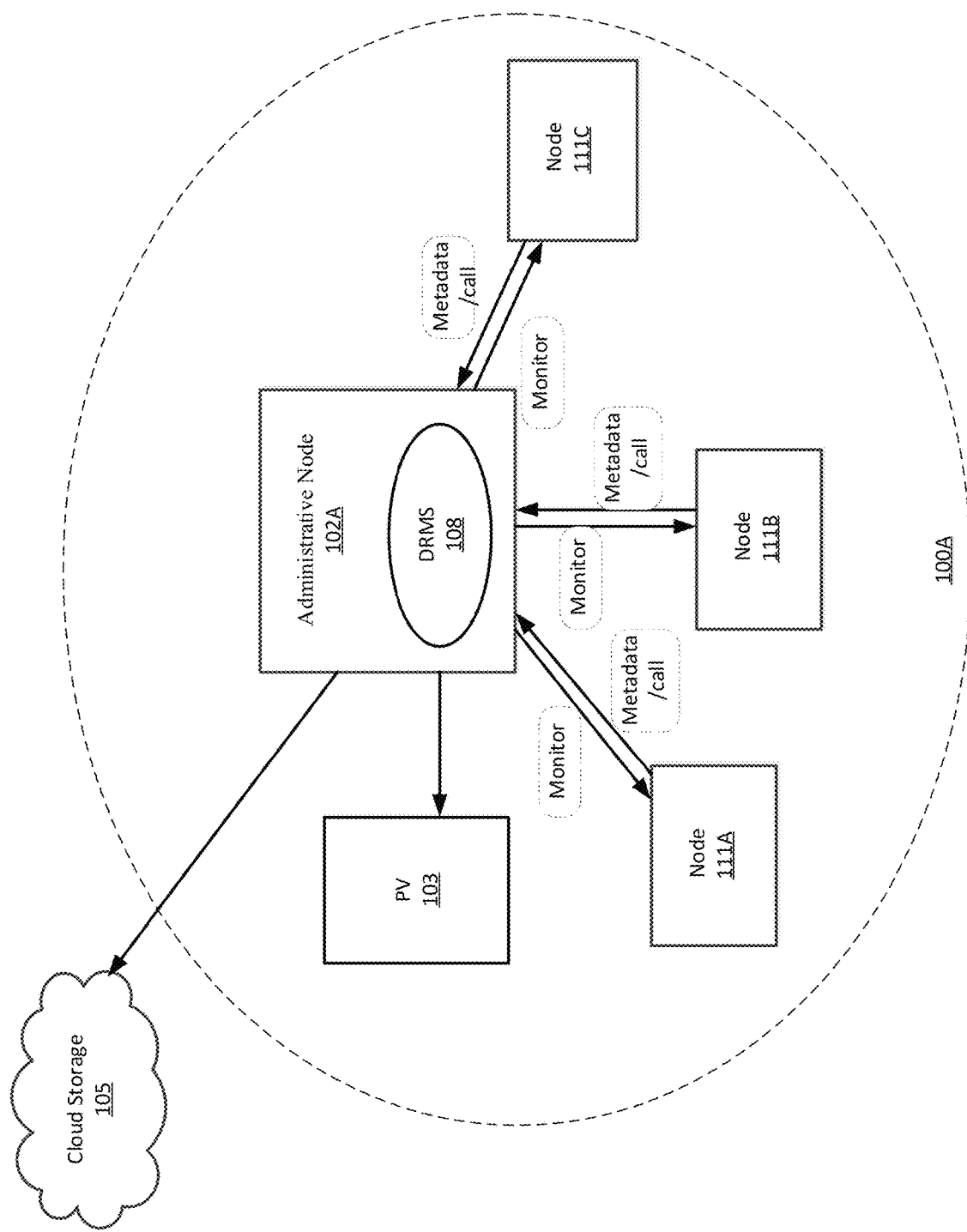
FIG. 1 is a block diagram that illustrates an example mesh network, in accordance with some embodiments of the present disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Mesh networking is an approach to organizing device-to-device (node-to-node) communication, for example, within Internet of Things (IoT) platforms. From an IoT perspective, a mesh network may include multiple individual nodes/devices, which connect directly, dynamically and non-hierarchically to as many other nodes/devices as possible and cooperate with one another to efficiently route data from/to clients. Each node/device of the mesh network may store and/or run its own versions of firmware and service versions. The mesh network, from the outside, may be perceived as a singular entity, with the capability of being interfaced through gateway services.

In the mesh network, there are a plurality of nodes or mesh devices which generate data and store data. The nodes may suffer from environmental challenges such as light, heat etc. The lifespan of a typical node may be shortened by the environmental challenges. While cloud resources may be used to mitigate the lost data, the cloud resources may not be available at all times. Data may be stored locally in the nodes. It is challenging to perverse data when a node may be going to have a failure.

Aspects of the present disclosure address the above noted and other deficiencies by using a data risk mitigation service (DRMS) which sits in the mesh and communicates with an administrator node (e.g., a central mesh controller). This administrator node has a view of all devices and diagnostics which give a health state of the mesh at a given time. The DRMS may be configurable by a rule engine which governs when the mitigating actions should be taken. The DRMS monitors for key metadata such as the load on the node, the CPU usage, the heat level, the firmware versions, the recent network connectivity issues or monitoring for "call for help" from nodes on the mesh network (for example, by monitoring 'mayday-relay'). Utilising this metadata bundle, the DRMS identifies if a node is at risk from data loss. If the rules trigger the DRMS with respect to the impacted node, an Ansible™ script may be deployed to reroute the incoming data (e.g., storage requests) of the node and to evacuate data already stored in the node which is at risk, for example, by pointing at a local persistent volume, connecting to an Amazon web services (AWS) bucket if available, or opening a data stream directing to another nearby node to stream the data for storage, or a combination of all. The location of the data may be tagged within the receiving node such that when a recovery operation occurs, the source of the data may be identified. The DRMS may continue the rerouting operation and the evacuating operation until a point in time where the stability of the node is reached. A real time policy management technique may be used to allow for a high degree of customization if a strategy needs to be changed, e.g., a destination node is being overwhelmed or a new neighbor node has arrived.

Advantageously, the incoming data of the node and the data already stored in the node may be preserved in this way. Accordingly, the embodiments of the present disclosure may perverse data in the situation when the node is going to have a failure, thereby providing a resiliency to the data in the mesh network and preventing the users from suffering data loss. The embodiments of the present disclosure allow for a multi-spectrum approach to rerouting and evacuating data. The rerouted and evacuated data may be tracked and traced, allowing for the rerouted and evacuated data to be retrieved and restored as necessary. The embodiments of the present disclosure enable safer data practices within the mesh network.

FIG. 1 is a block diagram that illustrates an example mesh network 100A, in accordance with some embodiments of the present disclosure. As illustrated in FIG. 1, the mesh network 100A includes an administrative node 102A and a plurality of nodes (e.g., 111A, 111B, 111C). The plurality of nodes (e.g., 111A, 111B, 111C) connect directly, dynamically and non-hierarchically to as many other nodes as possible and cooperate with one another. The mesh network 100A may include a local persistent volume (PV) 103 to store data, and may connect to a cloud storage 105 such as an AWS, an IBM Cloud, a Google Cloud, etc.

FIG. 1 and the other figures may use like reference numerals to identify like elements. A letter after a reference numeral, such as "102A" indicates that the text refers specifically to the element having that particular reference numeral. A reference numeral in the text without a following letter, such as "102" refers to any or all of the elements in the figures bearing that reference numeral.

The administrative node 102A may have the administrative power for the mesh network 100A. The administrative node 102A may oversee and manage the mesh network. The administrative node 102A may have a view of all nodes 111 (or devices). The administrative node 102A may have the diagnostics of the nodes which give a health state of each node in the mesh network at a given time. The administrative node 102A may know the type and capability of each node in the mesh network. The administrative node 102A may have information of the diagnostics of a health state of each node 111 of the mesh network 100A. The administrative node 102A may have access of the metadata indicating the health state of each node 111 in the mesh network 100A. Since the membership of the mesh network may constantly change with nodes joining and leaving, the administrative node 102A may manage and update the information regarding the nodes 110 in the mesh network 100A.

Each of the administrative node 102A and/or the plurality of nodes 111 may be coupled to each other (e.g., may be operatively coupled, communicatively coupled, may communicate data/messages with each other) via a public network (e.g., the internet), a private network (e.g., a local area network (LAN) or wide area network (WAN)), or a combination thereof. In one embodiment, the mesh network 100A may include a wired or a wireless infrastructure, which may be provided by one or more wireless communications systems, such as a WiFi™ hotspot connected with the mesh network and/or a wireless carrier system that can be implemented using various data processing equipment, communication towers (e.g. cell towers), etc. The mesh network 100A may also include various components such as switches, routers, bridges, gateways, servers, computers, cables, virtual machines, integrated circuits, etc. which may carry communications (e.g., data, messages, packets, frames, etc.) between the administrative node 102A and the plurality of nodes 111 as well as any other components of mesh network 100A.

In one embodiment, administrative node 102A and the plurality of nodes 111 may include hardware such as processing devices (e.g., processors, central processing units (CPUs), memory (e.g., random access memory (RAM), storage devices (e.g., hard-disk drive (HDD), solid-state drive (SSD), etc.), and other hardware devices (e.g., sound card, video card, etc.). The administrative node 102A and the plurality of nodes 111 may each comprise any suitable type of computing device(s) or machine(s) that has a programmable processor including, for example, server computers, desktop computers, laptop computers, tablet computers, smartphones, set-top boxes, etc. The administrative node 102A and each of the plurality of nodes 111 may be a single machine or may include multiple interconnected machines (e.g., multiple computers configured in a cluster). In another embodiment, the administrative node 102A and each of the plurality of nodes 111 may be a virtual machine (VM). A VM may be an emulation of a computing device. The VM may execute on a hypervisor (not shown) which executes on top of an operating system for a host computing device. The hypervisor may manage system resources (e.g., may manage access to hardware devices, such as processors, memories, storage devices, etc., of the host computing device). The hypervisor may also emulate the hardware (or other physical resources) which may be used by the VMs to execute software and/or applications.

The administrative node 102A and the plurality of nodes 111 may each be any suitable type of computing device or machine that has a processing device, for example, a server computer (e.g., an application server, a catalog server, a communications server, a computing server, a database server, a file server, a game server, a mail server, a media server, a proxy server, a virtual server, a web server), a desktop computer, a laptop computer, a tablet computer, a mobile device, a smartphone, a set-top box, a graphics processing unit (GPU), etc. In some examples, a computing device may comprise a single machine or may include multiple interconnected machines (e.g., multiple servers configured in a cluster). The administrative node 102A and/or the plurality of nodes 111 may be implemented by a common entity/organization or may be implemented by different entities/organizations. For example, the administrative node 102A may be operated by a first company/corporation and some of the plurality of nodes may be operated by a second company/corporation.

Figure 2:
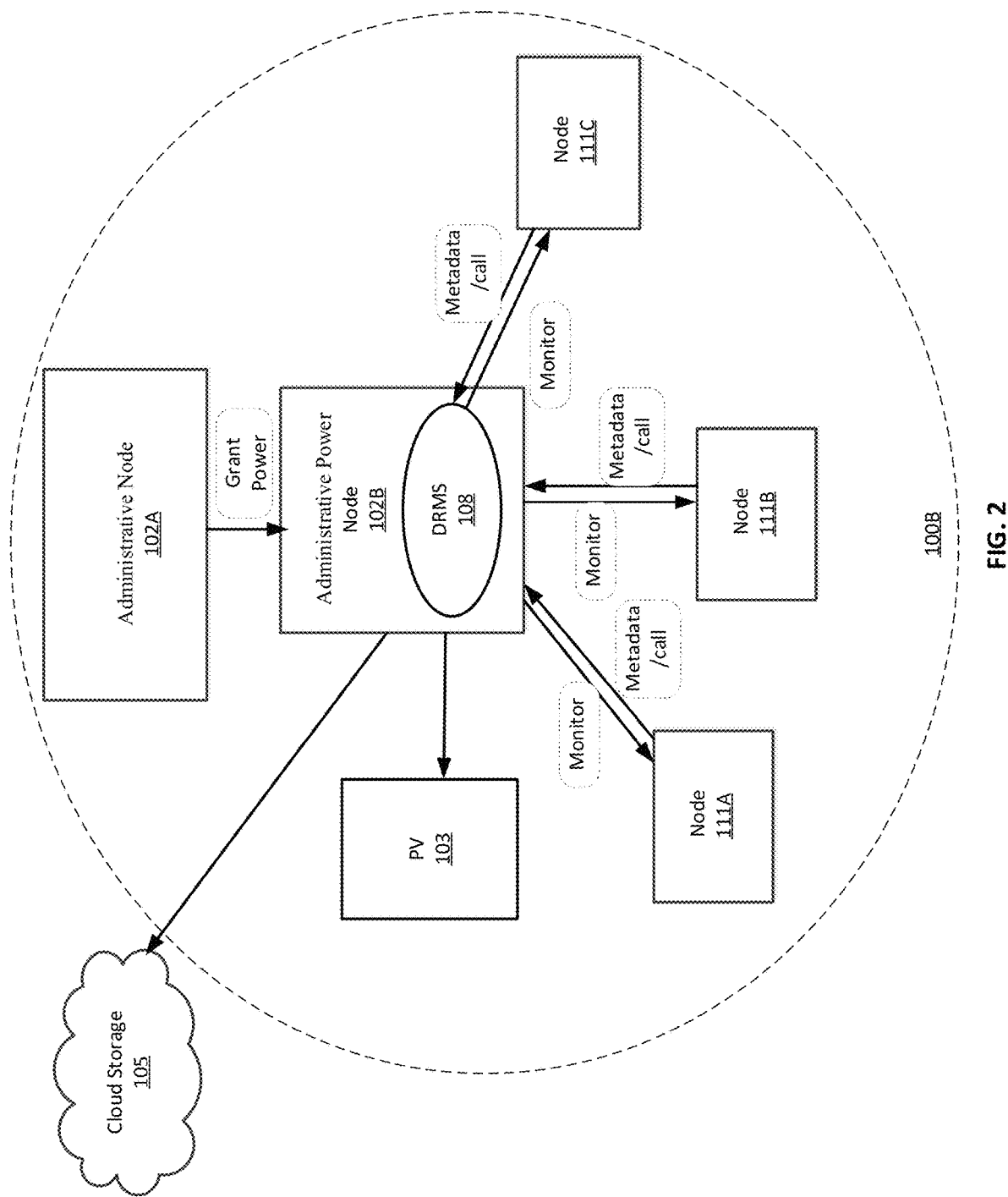
FIG. 2 is a block diagram that illustrates another example mesh network, in accordance with some embodiments of the present disclosure.

Referring to FIG. 1, the administrative node 102A in the mesh network 100A may execute, by a processing device of the administrative node, a DRMS 108 to preserve data of the node 111. In one embodiment, the DRMS 108 may sit in the administrative node 102A (e.g., a central mesh controller) in the mesh network 100A. In another embodiment, the DRMS 108 may sit in an administrator power node 102B (as illustrated in FIG. 2). Any node 111 in the mesh network may be granted the administrator power by the administrative node 102A and may become the administrator power node 102B. For each node 111 in the mesh network 100A, the DRMS 108 may monitor the metadata indicating a health state of a node or a call for help from the node. The metadata may include the load on the node, a usage of a CPU of the node, a temperature of the node, a heat level of the node, a firmware version of the node, a recent network connectivity issue, or a risk level of the node. The DRMS 108 may monitor the call for help from the node, such as a "mayday" call, a distress call, etc. The DRMS 108 may be configurable by a rule engine (not shown) which governs when the mitigating actions should be taken.

FIG. 2 is a block diagram that illustrates another example mesh network 110B, in accordance with some embodiments of the present disclosure. The mesh network 100B includes an administrative node 102A, an administrator power node 102B and a plurality of nodes (e.g., 111A, 111B, 111C). The plurality of nodes (e.g., 111A, 111B, 111C) connect directly, dynamically and non-hierarchically to as many other nodes as possible and cooperate with one another. The mesh network 100B may include a local persistent volume (PV) 103 to store data, and may connect to a cloud storage 105 such as an AWS.

Each of the administrative node 102A, the administrator power node 102B and/or the plurality of nodes 111 may be coupled to each other (e.g., may be operatively coupled, communicatively coupled, may communicate data/messages with each other) via a public network (e.g., the internet), a private network (e.g., a local area network (LAN) or wide area network (WAN)), or a combination thereof. In one embodiment, the mesh network 100B may include a wired or a wireless infrastructure, which may be provided by one or more wireless communications systems, such as a WiFi™ hotspot connected with the mesh network and/or a wireless carrier system that can be implemented using various data processing equipment, communication towers (e.g. cell towers), etc. The mesh network 100B may also include various components such as switches, routers, bridges, gateways, servers, computers, cables, virtual machines, integrated circuits, etc. which may carry communications (e.g., data, messages, packets, frames, etc.) between the administrative node 102A, the administrator power node 102B and the plurality of nodes 111 as well as any other components of mesh network 100B.

In one embodiment, administrative node 102A, the administrator power node 102B and the plurality of nodes 111 may include hardware such as processing devices (e.g., processors, central processing units (CPUs), memory (e.g., random access memory (RAM), storage devices (e.g., harddisk drive (HDD), solid-state drive (SSD), etc.), and other hardware devices (e.g., sound card, video card, etc.). The administrative node 102A, the administrator power node 102B and the plurality of nodes 111 may each comprise any suitable type of computing device(s) or machine(s) that has a programmable processor including, for example, server computers, desktop computers, laptop computers, tablet computers, smartphones, set-top boxes, etc. The administrative node 102A, the administrator power node 102B and each of the plurality of nodes 111 may be a single machine or may include multiple interconnected machines (e.g., multiple computers configured in a cluster). In another embodiment, the administrative node 102A, the administrator power node 102B and each of the plurality of nodes 111 may be a VM.

The DRMS 108 may run on any node in the mesh network, as long as the node has the administrative power. As illustrated in FIG. 2, the administrative node 102A may grant the administrative power to a node such that the node may become the administrator power node 102B. For example, the administrator power node 102B may have access to the metadata indicating a health state of each node or the call for help from the node. The administrator power node 102B may have information regarding all the nodes 111 in the mesh network 110B, and have information regarding how to access each node in the mesh network 110B.

The administrator power node 102B may execute the DRMS 108 to preserve data of the node 111. For each node in the mesh network 100B, the DRMS 108 may monitor the metadata indicating a health state of a node or a call for help from the node. The metadata may include the load on the node, a usage of a CPU of the node, a temperature of the node, a heat level of the node, a firmware version of the node, a recent network connectivity issue, or a risk level of the node. The DRMS 108 may monitor the call for help from the node, such as a "mayday" call, a distress call, etc. The DRMS 108 may be configurable by a rule engine (not shown) which governs when the mitigating actions should be taken.

Figure 3:
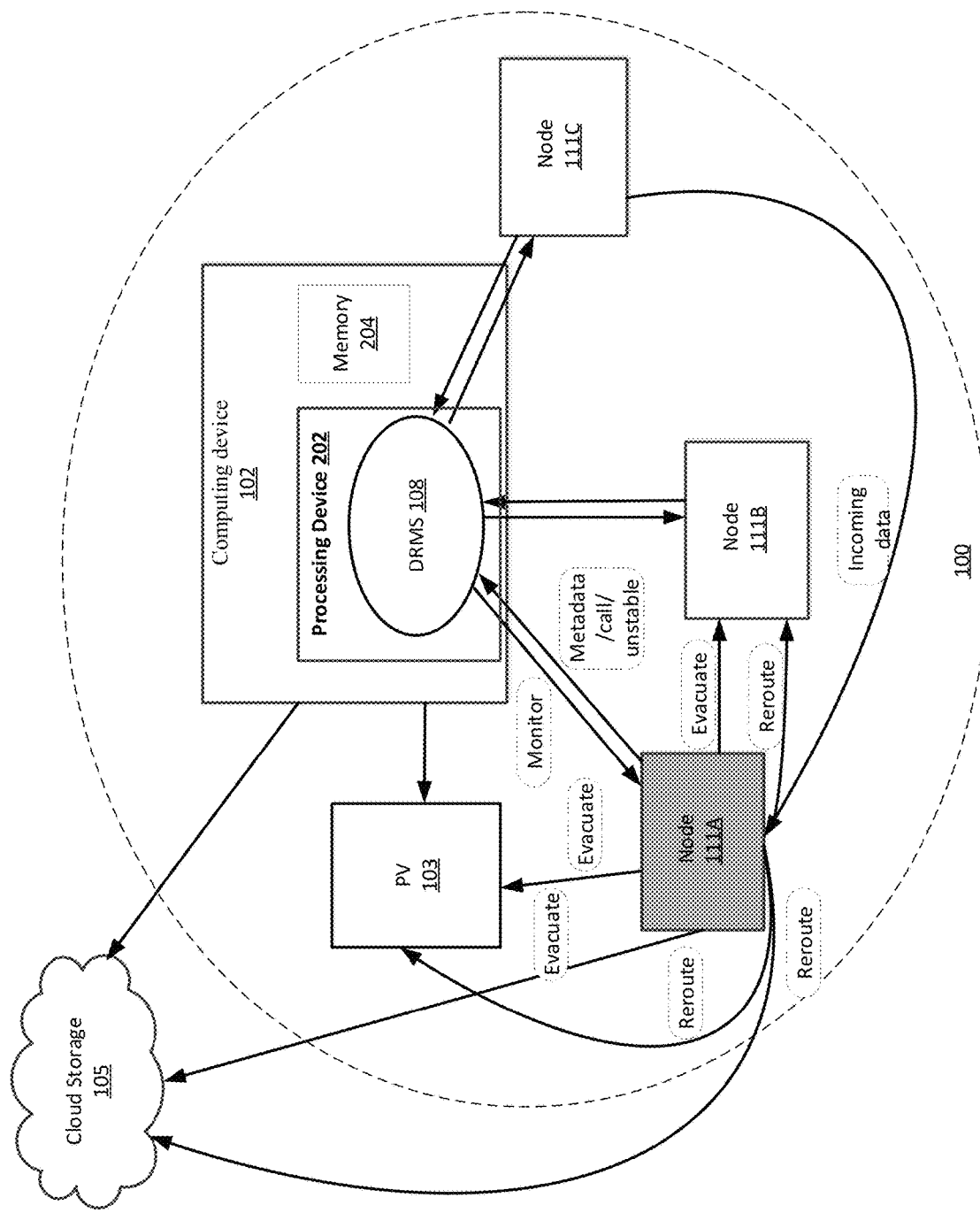
FIG. 3 is a block diagram illustrating an example of a system for data preservation in a mesh network, according to some embodiments.

FIG. 3 is a block diagram illustrating an example of a system for data preservation in the mesh network 100, according to some embodiments. In some embodiments, the system may include a computing device 102. The mesh network 100 may include the computing device 102 and a plurality of nodes (e.g., 111A, 111B, 111C). In one embodiment, the mesh network 100 may include the mesh network 100A in FIG. 1, and the computing device 102 may include the administrative node 102A in FIG. 1. In another embodiment, the mesh network 100 may include the mesh network 100B in FIG. 1, and the computing device 102 may include the administrator power node 102B. The computing device 102 may include a processing device 202 and a memory 204, as illustrated in FIG. 3.

The processing device 202 may execute the DRMS 108 to preserve data of the node 111. For each node in the mesh network 100, the DRMS 108 may monitor the metadata indicating a health state of a node or a call for help from the node. The health state of the node may include an unstable state, a stable state and an intermediate state. The unstable state may be a state in which the node may be at risk from data loss. The stable state may be a state in which the node may operate normally and not be at risk from data loss. The intermediate state may be a state between the unstable state and the stable state.

As an example, the DRMS 108 may monitor the metadata of the node 111A and/or a call for help from the node 111A. The DRMS 108 may monitor the call for help from the node 111A, such as a "mayday" call which may be a call to help when the node 111A is going to fail imminently. When the call for help from the node 111A such as the "mayday" call is received, the DRMS 108 determines the node 111A is at the unstable state and at risk from data loss.

In view of the metadata of the node 111A, the DRMS 108 identifies or determines if the node 111A is at risk from data loss. The DRMS 108 may be configurable by a rule engine (not shown) which governs when the node is an unstable node and mitigating actions should be taken. The DRMS 108 may identify if the node 111A is at risk from data loss based on board operating system level diagnostics in view of the metadata. The metadata may indicate the node is going to potentially degrade in terms of performance or suffer a catastrophic failure. The metadata of the node 111A may include a set of metrics. The set of metrics may include the load on the node 111A, a usage of a CPU of the node 111A, a temperature of the node 111A, a firmware version of the node 111A, a recent network connectivity issue, or a risk level of the node 111A. In some embodiments, the DRMS 108 may determine if the node 111A is an unstable node based on the set of metrics satisfying a first set of thresholds according to a first set of rules. The first set of rules may be configured on a per node basis. The DRMS may be configured to have the first set of rules for each node. The first set of rules may be threshold oriented rules.

The first set of thresholds may include one or more first thresholds for the set of metrics. As an example, a first threshold for the CPU usage may be at 75%, 90%, 99% or any values there between. As an example, a first time threshold for a high CPU usage (e.g., at 75%, 90%, 99%) may be 1 hour, 2 hours, 3 hours, 5 hours, 10 hours, or any values there between. The first set of thresholds may include a time threshold for a CPU temperature at certain degrees. As an example, a first time threshold for the CPU temperature at 60 degrees Celsius may be 10 minutes, 20 minutes, 30 minutes, 1 hour, 2 hours, 3 hours, or any values there between. The one or more first thresholds may be configured on a per node basis. The one or more first thresholds may be configured for each node. For example, a node with a larger load may have lower one or more first thresholds than a node with a smaller load. For the node with the larger load, the one or more first thresholds may be lower such that the data on the node may be evacuated earlier to have enough time to preserve the data on the node. The one or more first thresholds may be dynamically created and adjusted.

In some embodiments, the DRMS 108 may determine if the node 111A is an unstable node based on a combination of different metrics, in order to avoid false positive. In some embodiments, the DRMS 108 may determine if the node 111A is an unstable node based on a single metric satisfying a predetermined threshold. In some embodiments, the DRMS 108 may assign a risk score to the node 111A based on a combination of metrics. As an example, the DRMS 108 may assign a weight to each metric and determine the risk score of the node 111A based on the combination of the weighted metrics. The first set of rules may include the combination of different metrics, the single metric, or the combination of the weighted metrics. The risk score may be configured for each node. For example, a node with a larger load may have a larger risk score than a node with a smaller load.

If the first set of rules trigger the DRMS 108 with respect to the impacted node 111A, incoming data (e.g., storage requests) of the node may be rerouted and data already stored in the node may be evacuated. For example, the incoming data of the node 111A may include incoming data from a different node 111C to the node 111A, as illustrated in FIG. 3. As an example, the incoming data of the node 111A may include the network requests and/or the storage requests coming to the node 111A. As an example, the incoming data of the node 111A may include the storage request from a different node 111C. The DRMS 108 may reroute the network requests and the storage requests coming to the node 111A and evacuate the data already stored on the node. In some embodiments, a script, such as an Ansible script, may be deployed onto the node 111A to reroute the incoming data of the node and to evacuate data already stored in the node which is at risk. As an example, Ansible may include an IT automation engine that automates cloud provisioning, configuration management, application deployment, intra-service orchestration, and many other IT needs. For example, the script, such as the Ansible script, may be deployed onto the node 111A to reroute the incoming data or evacuate the stored data by pointing at a local persistent volume (PV) 103, connecting to a cloud storage such as an AWS bucket, or opening a data stream directing to another node (e.g., a nearby node 111B) to stream the data for storage, or a combination of all.

As an example, as illustrated in FIG. 3, the node 111C may send a storage request to the node 111A, thus, the node 111A may be asked to store the data from the node 111C. Then, the script, such as the Ansible script, may be employed within the node 111A to reroute the incoming storage request from the node 111C to the node 111B, in order to prevent new data landing on the node 111A. As another example, the DRMS 108 may communicate with the node 111A to evacuate the data already stored in the node. The DRMS 108 may deploy the script, such as the Ansible script, to associate one or more additional storage locations with the node 111A. For example, the DRMS 108 may make the PV103 available to the node 111A, or connecting the node 111A to the cloud storage 105 (e.g., AWS storage), or let the node 111A to offload the stored data to another node (e.g., the node 111B). For example, the Ansible script may connect the node 111A to the additional data storage locations to begin the process of copying, transferring, or offloading the data in the node 111A to the additional data storage locations. Thus, when the node 111A is going to have a failure or go offline, the incoming data of the node 111A has been rerouted to one or more safe destinations and the existing data in the node 111A has been backed up, therefore, data loss has been prevented.

In some embodiments, network rules and/or firewall rules may be used to reroute the incoming data of the node 111A and to evacuate data already stored in the node. As an example, the network tables for routes may be updated, and the routes to the node 111A may be removed. As an example, a firewall associated with the node 111A may be turned on.

The incoming data of the node 111A may be rerouted to a first destination, and the data stored in the node 111A may be evacuated to a second destination, wherein each destination of the first destination and the second destination includes at least one of a persistent volume, a cloud storage, or another node 111B in the mesh network 100. In one embodiment, the first destination is the same as the second destination. In another embodiment, the first destination is different than the second destination. In one embodiment, the first destination may include one or more nodes, PVs, or cloud storage locations. In one embodiment, the second destination may include one or more nodes, PVs, or cloud storage locations. As an example, The DRMS 108 may determine the destination of the rerouted data and/or the evacuated data based on the capabilities of the receiving node. Since the DRMS 108 runs on the computing device 102, which may be the administrative node 102A or the administrative power node 102B, the DRMS 108 may have the information regarding the capabilities of the receiving node, e.g., the node 111B. Thus, the DRMS 108 may select the node 111B based on its capabilities and its geographical location. In this way, the DRMS 108 may determine the safe destination of the rerouted data and/or the evacuated data.

In some embodiments, the source node 111A of the rerouted data and/or the evacuated data may be tagged within the receiving node 111B such that when a recovery operation occurs, the source node 111A of the rerouted data and/or the evacuated data may be identified. As an example, the DRMS 108 may maintain a look up table (e.g., 109 in FIG. 4) which may include the information of the source node 111A of the rerouted data and/or the evacuated data, and the first destination for the rerouted data and/or the second destination for the evacuated data. The look up table may include a mapping or a correspondence between the source node 111A of the rerouted data and the first destination for the rerouted data, and/or the source node 111A of the evacuated data and the second destination for the evacuated data. As an example, the DRMS 108 may keep a record or a list for the node 111A including the one or more destinations of each file of the data stored on the node, and/or one or more destinations of the incoming data of the node. If there's a request for a file of the stored data on the node 111A coming from another device, the DRMS may find the file based on the look up table, the record or the list for the node 111A.

In this way, when the node 111A reaches a stable state, for example, the node has come back on line or being stabilized or being repaired, the node 111A may be recovered, for example, by stopping the rerouting of the network requests and the storage requests coming to the node, and returning the rerouted data and/or the evacuated data to the source node 111A from the first destination and/or the second destination back to the node 111A, such that the node 111A may continue to operate. As an example, the DRMS may inform the node 111C to store the incoming data on the node 111A.

Figure 4:
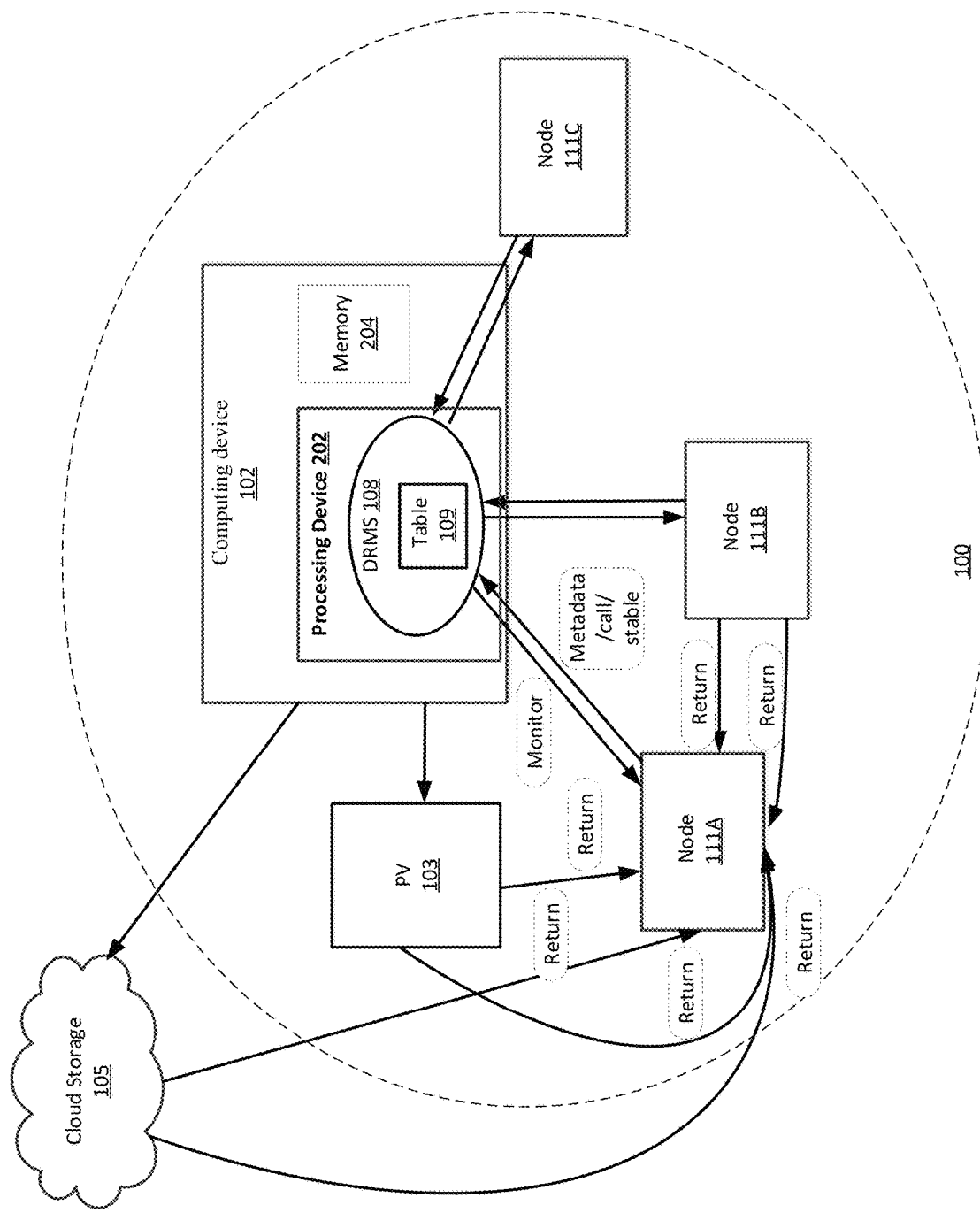
FIG. 4 is a block diagram illustrating an example of a system for data preservation in a mesh network, according to some embodiments.

FIG. 4 is a block diagram illustrating the system in FIG. 3 for data preservation in the mesh network 100, according to some embodiments. As discussed above, If the first set of rules trigger the DRMS 108 with respect to the node 111A, the DRMS 108 may reroute the incoming data of the node 111A and evacuate the data already stored in the node. The DRMS 108 may continue the rerouting operation and the evacuating operation on the node 111A until a point in time where the stability of the node 111A is reached.

The DRMS 108 may continue to monitor each node 111 for the metadata indicating the health state of each node. The DRMS 108 may determine that the node 111A reaches a stable state, for example, the node has come back on line or being stabilized or being repaired, in view of the set of metrics satisfying a second set of thresholds according to a second set of rules. Then, the DRMS 108 may stop the rerouting of the incoming data (e.g., network requests and the storage requests coming to the node) and evacuating the data stored on the node 111A.

A period of stabilization may be need for the node 111A to reach the stable state in order to avoid route flapping. In computer networking, route flapping may occur when a router may alternately advertise a destination network via one route then another, or as unavailable and then available again, in quick sequence. As an example, the CPU usage of the node 111A may drop below the first threshold according to the first set of rules, however, the CPU usage may be high again as soon as the node 111A being reconfigured to operate again. The second set of thresholds may include one or more second thresholds for the set of metrics. As an example, the second set of thresholds may be lower or higher than the corresponding first set of thresholds. As an example, a second threshold for the CPU usage may be at 50%, while a first threshold for the CPU usage may be at 75%. The DRMS 108 may monitor the metadata and determine whether to take the mitigating actions to reroute the incoming data and evacuate the stored data on the node 111A based on the first set of thresholds according to the first set of rules. Then, the DRMS 108 may switch to monitor the metadata and determine whether to stop the mitigating actions and restore the node 111A based on the second set of thresholds according to the second set of rules. The DRMS 108 may recovering the node 111A by returning the rerouted data of the node and the evacuated data of the node back to the node 111A, as illustrated in FIG. 4. For example, the DRMS 108 may return the rerouted data and the evacuated data back to the node 111A based on the look up table 109, the record or the list for the node 111A.

A real time policy management technique may be used to allow for a high degree of customization if a strategy needs to be changed, e.g., a destination node is being overwhelmed or a new neighbor node has arrived. The first set of rules and/or the second set of rules may be created and/or adjusted dynamically, based on the environment of the node, such as the destination node 111B being overwhelmed, or a new nearby node being arrived. As an example, if a new node has been added to the mesh network 100, a new rule may be created and added to in the first set of rules and/or the second set of rules, and the new rule may be about the new node's behavior to services the new node is interacting with and so on. The first set of rules and/or the second set of rules may be extensible to allow one or more new rules to be created and developed based on the actual usage of the mesh network 100. For example, for the purpose of load balancing, the incoming data of a node may be rerouted and data stored in the node may be evacuated, to avoid the node becoming overwhelmed and having slower and longer response time. The one or more new rules may be created dynamically and inserted into the runtime first set of rules and/or the runtime second set of rules, e.g., based on the environment of the node. The first set of rules and/or the second set of rules may be on a per node basis. Each node may have different need. The first set of rules and/or the second set of rules may be configured differently for different node. The first set of rules and/or the second set of rules may be customized for each node, and may be dynamic to change over time based on the environment and the context of the node.

In this way, the incoming data of the node and the data already stored in the node may be preserved. The rerouted and evacuated data may be tracked and traced, allowing for the rerouted and evacuated data to be retrieved and restored as necessary.

Figure 5A:
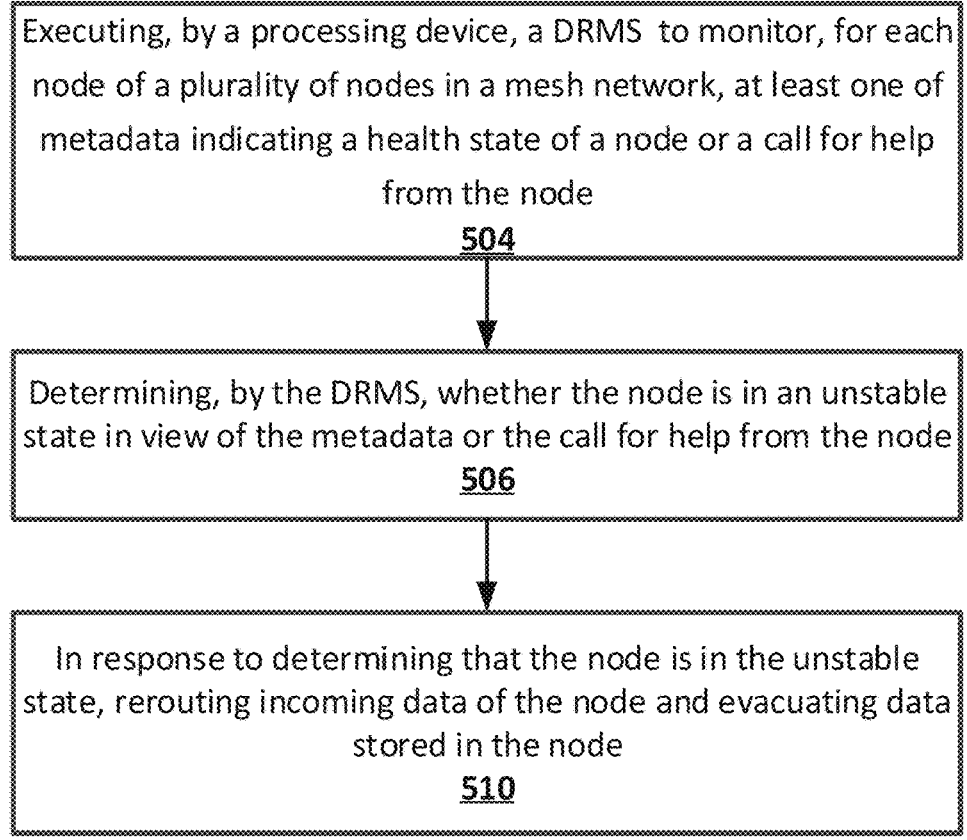
FIG. 5A is a flow diagram of a method of data preservation in a mesh network, in accordance with some embodiments of the present disclosure.

FIG. 5A is a flow diagram of a method 500a of data preservation in a mesh network, in accordance with some embodiments of the present disclosure. Referring to FIG. 5A, method 500a may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 500 may be performed by a computing device (e.g., the administrative node 102A, the administrative power node 102B, the computing device 102).

At block 504, the processing logic executes a data DRMS, to monitor, for each node of a plurality of nodes in a mesh network, at least one of metadata indicating a health state of a node or a call for help from the node. Referring back to FIGS. 1-4, the processing device 202 may execute the DRMS 108 to preserve data of the node 111. For each node in the mesh network 100, the DRMS 108 may monitor the metadata indicating a health state of a node or a call for help from the node. As an example, the DRMS 108 may monitor the metadata of the node 111A and/or a call for help from the node 111A. The DRMS 108 may monitor the call for help from the node 111A, such as a "mayday" call which may be a call to help when the node 111A is going to fail imminently.

At block 506, the processing logic determines whether the node is in an unstable state in view of the metadata or the call for help from the node. Referring back to FIGS. 1-4, in view of the metadata of the node 111A, the DRMS 108 identifies or determines if the node 111A is at risk from data loss. The metadata of the node 111A may include a set of metrics. The set of metrics may include the load on the node 111A, a usage of a CPU of the node 111A, a temperature of the node 111A, a firmware version of the node 111A, a recent network connectivity issue, or a risk level of the node 111A.

In some embodiments, the processing logic may determine that the node is in the unstable state in view of the set of metrics satisfying a first set of thresholds according to a first set of rules or receiving the call for help from the node. Referring back to FIGS. 1-4, in some embodiments, the DRMS 108 may determine if the node 111A is an unstable node based on the set of metrics satisfying a first set of thresholds according to a first set of rules.

At block 510, the processing logic, in response to determining that the node is in the unstable state, reroutes incoming data of the node and evacuates data stored in the node. Referring back to FIGS. 1-4, if the first set of rules trigger the DRMS 108 with respect to the impacted node 111A, incoming data (e.g., storage requests) of the node may be rerouted and data already stored in the node may be evacuated. In some embodiments, a script, such as an Ansible script, may be deployed onto the node 111A to reroute the incoming data of the node and to evacuate data already stored in the node which is at risk. For example, the script, such as the Ansible script, may be deployed onto the node 111A to reroute the incoming data or evacuate the stored data by pointing at a local persistent volume (PV) 103, connecting to a cloud storage such as an AWS bucket, or opening a data stream directing to another node (e.g., a nearby node 111B) to stream the data for storage, or a combination of all. In some embodiments, the processing logic may deploy a script onto the node or using at least one of network rules or firewall rules to reroute the incoming data of the node and evacuate the data stored in the node.

By this method, the incoming data of the node and the data already stored in the node may be preserved. Advantageously, the method preserves data of the node in the situation when the node is going to have a failure, thereby providing a resiliency to the data in the node in mesh network and preventing the users from suffering data loss. The method allows for a multi-spectrum approach to rerouting and evacuating data. The rerouted and evacuated data may be tracked and traced, e.g., by a lookup table, allowing for the rerouted and evacuated data to be retrieved and restored as necessary. The method enables safer data practices within the mesh network.

Figure 5B:
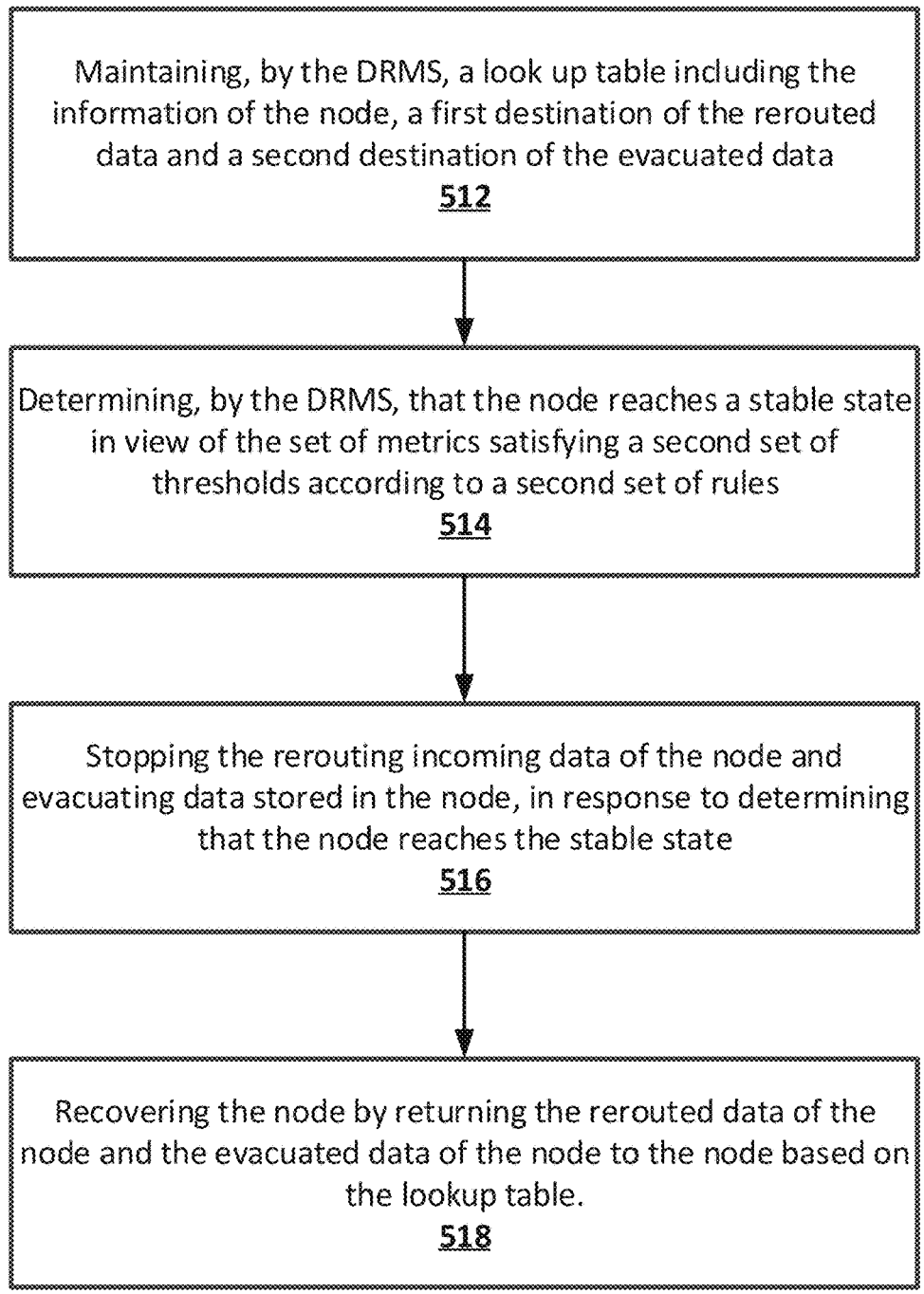
FIG. 5B is a flow diagram of a method of data preservation in a mesh network, in accordance with some embodiments of the present disclosure.

FIG. 5B is a flow diagram of a method 500b of data preservation in a mesh network, in accordance with some embodiments of the present disclosure. Referring to FIG. 5B, method 500b may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 500 may be performed by a computing device (e.g., the administrative node 102A, the administrative power node 102B, the computing device 102).

At block 512, the processing logic may maintain a lookup table including the information of the node, a first destination of the rerouted data and a second destination of the evacuated data.

At block 514, the processing logic may determine that the node reaches a stable state in view of the set of metrics satisfying a second set of thresholds according to a second set of rules.

At block 516, the processing logic may stop the rerouting incoming data of the node and evacuating data stored in the node, in response to determining that the node reaches the stable state.

At block 518, the processing logic may recover the node by returning the rerouted data of the node and the evacuated data of the node to the node based on the lookup table.

By this method, the incoming data of the node and the data already stored in the node may be preserved. The rerouted and evacuated data may be tracked and traced, e.g., by a lookup table, allowing for the rerouted and evacuated data to be retrieved and restored as necessary. The method enables safer data practices within the mesh network.

Figure 6:
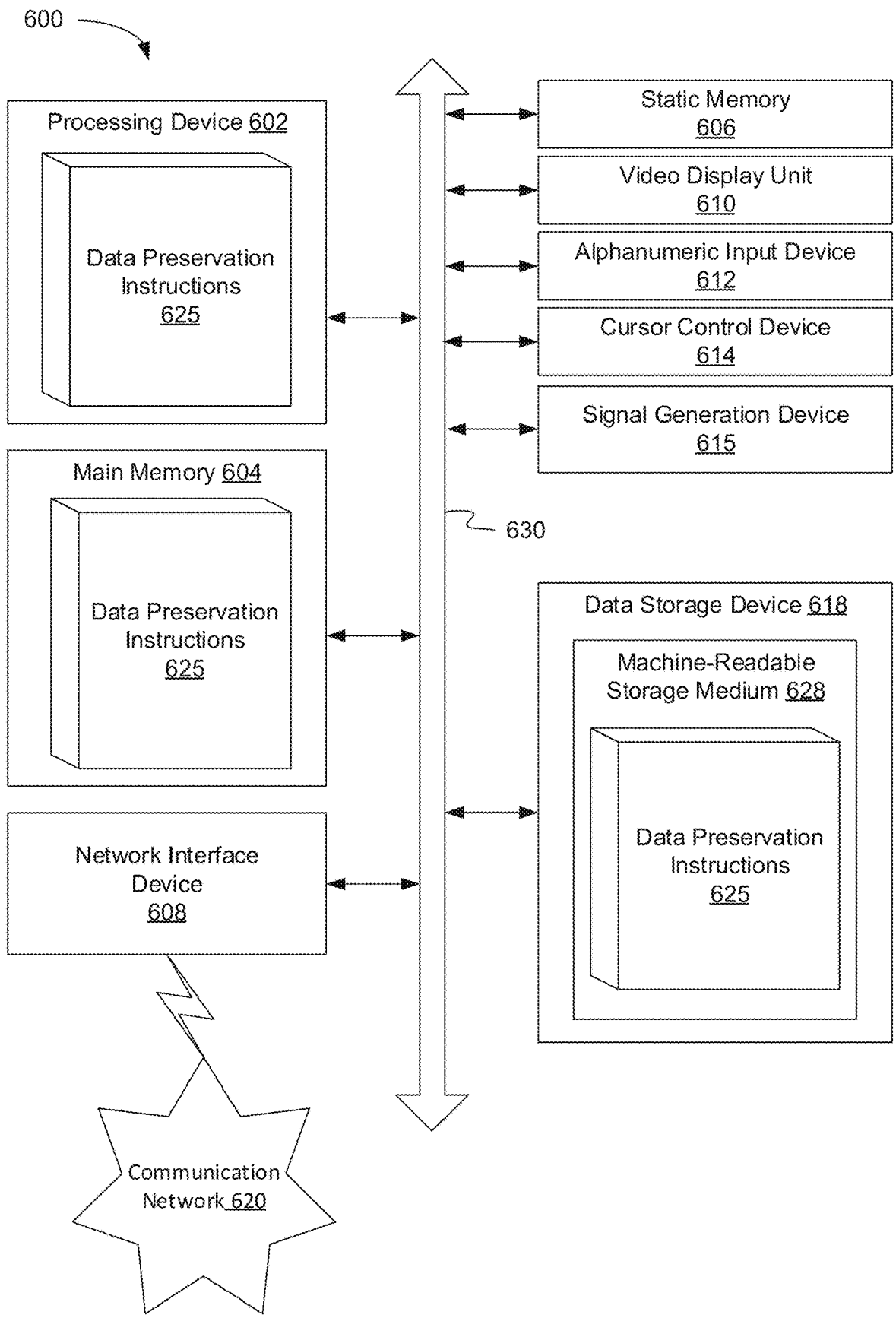
FIG. 6 is a block diagram of an example computing device that may perform one or more of the operations described herein, in accordance with some embodiments of the present disclosure.

FIG. 6 is a block diagram of an example computing system 600, in accordance with some embodiments of the present disclosure. A diagrammatic representation of a machine in the example form of the computer system 600 within which a set of instructions including staging instructions, for causing the machine to perform any one or more of the methodologies discussed herein. More specifically, the machine may execute a DRMS to monitor, for each node of a plurality of nodes in a mesh network, at least one of metadata indicating a health state of a node or a call for help from the node. The machine may determine whether the node is in an unstable state in view of the metadata or the call for help from the node. The machine may reroute incoming data of the node and evacuating data stored in the node, in response to determining that the node is in the unstable state.

In some embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, the computer system 600 may be representative of a computing device, such as the computing device 102 configured to perform one or more functions described herein.

The exemplary computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute data preservation instructions 625, for performing the operations and steps discussed herein.

The data storage device 618 may include a machine-readable storage medium 628, on which is stored one or more sets of data preservation instructions 625 (e.g., software) embodying any one or more of the methodologies of functions described herein, including instructions to cause the processing device 602 to perform one or more of the functions described herein. The data preservation instructions 625 may also reside, completely or at least partially, within the main memory 604 or within the processing device 602 during execution thereof by the computer system 600; the main memory 604 and the processing device 602 also constituting machine-readable storage media. The data preservation instructions 625 may further be transmitted or received over a network 620 via the network interface device 608.

The machine-readable storage medium 628 may also be used to store instructions to perform a method for creating a staging cluster and/or using the staging cluster, as described herein. While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof.

What is claimed is:

1. A method comprising:
   executing, by a processing device, a data risk mitigation service (DRMS), to monitor, for each node of a plurality of nodes in a mesh network, at least one of metadata indicating a health state of a node or a call for help from the node;
   determining, by the DRMS, whether the node is in an unstable state in view of the metadata or the call for help from the node; and
   in response to determining that the node is in the unstable state, by the DRMS, rerouting incoming data of the node to a first destination and evacuating data stored in the node to a second destination, wherein each destination of the first destination and the second destination comprises at least one of a persistent volume, a cloud storage, or another node in the mesh network.

2. The method of claim 1, wherein the metadata including a set of metrics, and wherein the set of metrics comprise a load on the node, a usage of a CPU of the node, a temperature of the node, a firmware version of the node, or a recent network connectivity issue.

3. The method of claim 2, further comprising
determining, by the DRMS, that the node is in the unstable state in view of the set of metrics satisfying a first set of thresholds according to a first set of rules or receiving the call for help from the node.

4. The method of claim 3, further comprising maintaining, by the DRMS, a lookup table including information of the node, the first destination of the rerouted data and the second destination of the evacuated data.

5. The method of claim 4, further comprising
determining, by the DRMS, that the node reaches a stable state in view of the set of metrics satisfying a second set of thresholds according to a second set of rules; and
stopping the rerouting incoming data of the node and evacuating data stored in the node, in response to determining that the node reaches the stable state.

6. The method of claim 5, further comprising
recovering the node by returning the rerouted data of the node and the evacuated data of the node to the node based on the lookup table.

7. The method of claim 1, wherein the rerouting the incoming data of the node and evacuating the data stored in the node comprises deploying, by the DRMS, a script onto the node or using at least one of network rules or firewall rules to reroute the incoming data of the node and evacuate the data stored in the node.

8. A system comprising:
a memory;
a processing device, operatively coupled with the memory, to:
execute a data risk mitigation service (DRMS) to monitor, for each node of a plurality of nodes in a mesh network, at least one of metadata indicating a health state of a node or a call for help from the node;
determine whether the node is in an unstable state in view of the metadata or the call for help from the node; and
in response to determining that the node is in the unstable state, reroute incoming data of the node to a first destination and evacuate data stored in the node to a second destination, wherein each destination of the first destination and the second destination comprises at least one of a persistent volume, a cloud storage, or another node in the mesh network.

9. The system of claim 8, wherein the metadata including a set of metrics, and wherein the set of metrics comprise a load on the node, a usage of a CPU of the node, a temperature of the node, a firmware version of the node, or a recent network connectivity issue.

10. The system of claim 9, wherein the processing device is further to determine that the node is in the unstable state in view of the set of metrics satisfying a first set of thresholds according to a first set of rules or receiving the call for help from the node.

11. The system of claim 10, wherein the processing device is further to maintain a lookup table including information of the node, the first destination of the rerouted data and the second destination of the evacuated data.

12. The system of claim 11, wherein the processing device is further to
determine that the node reaches a stable state in view of the set of metrics satisfying a second set of thresholds according to a second set of rules;
stop the rerouting incoming data of the node and evacuating data stored in the node, in response to determining that the node reaches the stable state; and
recover the node by returning the rerouted data of the node and the evacuated data of the node to the node based on the lookup table.

13. The system of claim 8, wherein the processing device is further to deploy a script onto the node or use at least one of network rules or firewall rules to reroute the incoming data of the node and evacuate the data stored in the node.

14. A non-transitory computer-readable storage medium including instructions that, when executed by a processing device, cause the processing device to:
execute a data risk mitigation service (DRMS) to monitor, for each node of a plurality of nodes in a mesh network, at least one of metadata indicating a health state of a node or a call for help from the node;
determine whether the node is in an unstable state in view of the metadata or the call for help from the node; and
in response to determining that the node is in the unstable state, reroute incoming data of the node to a first destination and evacuate data stored in the node to a second destination, wherein each destination of the first destination and the second destination comprises at least one of a persistent volume, a cloud storage, or another node in the mesh network.

15. The non-transitory computer-readable storage medium of claim 14, wherein the metadata including a set of metrics, and wherein the set of metrics comprise a load on the node, a usage of a CPU of the node, a temperature of the node, a firmware version of the node, or a recent network connectivity issue.

16. The non-transitory computer-readable storage medium of claim 15, wherein the processing device is further to
determine that the node is in the unstable state in view of the set of metrics satisfying a first set of thresholds according to a first set of rules or receiving the call for help from the node.

17. The non-transitory computer-readable storage medium of claim 16, wherein the processing device is further to maintain a lookup table including information of the node, the first destination of the rerouted data and the second destination of the evacuated data.

18. The non-transitory computer-readable storage medium of claim 17, wherein the processing device is further to
determine that the node reaches a stable state in view of the set of metrics satisfying a second set of thresholds according to a second set of rules;
stop the rerouting incoming data of the node and evacuating data stored in the node, in response to determining that the node reaches the stable state; and
recover the node by returning the rerouted data of the node and the evacuated data of the node to the node based on the lookup table.

19. The non-transitory computer-readable storage medium of claim 14, wherein the processing device is further to deploy a script onto the node or use at least one of network rules or firewall rules to reroute the incoming data of the node and evacuate the data stored in the node.

* * * * *